United States Patent
Schroderus

(10) Patent No.: US 12,206,723 B1
(45) Date of Patent: Jan. 21, 2025

(54) SYSTEMS AND METHODS FOR TESTING VIDEO STREAMING ON WIRELESS NETWORKS

(71) Applicant: Keysight Technologies, Inc., Santa Rosa, CA (US)

(72) Inventor: Jari Jukka Schroderus, Oulu (FI)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/218,946

(22) Filed: Jul. 6, 2023

(51) Int. Cl.
*H04L 65/80* (2022.01)
*H04L 65/61* (2022.01)

(52) U.S. Cl.
CPC .............. *H04L 65/80* (2013.01); *H04L 65/61* (2022.05)

(58) Field of Classification Search
CPC ................................ H04L 65/80; H04L 65/61
See application file for complete search history.

(56) References Cited

U.S. PATENT DOCUMENTS

| | | | | |
|---|---|---|---|---|
| 8,964,595 | B2 * | 2/2015 | Agarwal | H04W 36/0094 370/332 |
| 10,116,929 | B2 | 10/2018 | Gao et al. | |
| 10,244,418 | B2 * | 3/2019 | Gordon | H04L 41/5067 |
| 10,298,472 | B2 | 5/2019 | Chaiyochlarb et al. | |
| 10,999,345 | B2 * | 5/2021 | Cui | H04N 21/43637 |
| 2005/0089043 | A1 * | 4/2005 | Seckin | H04L 65/80 370/395.21 |
| 2007/0180106 | A1 * | 8/2007 | Pirzada | H04L 43/0888 709/224 |
| 2010/0208609 | A1 * | 8/2010 | Sundarraman | H04L 47/2433 370/252 |
| 2013/0291036 | A1 * | 10/2013 | Yamagishi | H04L 65/61 725/109 |
| 2015/0350603 | A1 * | 12/2015 | Assem Aly Salama | H04N 7/157 348/14.09 |
| 2016/0219092 | A1 * | 7/2016 | Tapia | H04L 65/1059 |
| 2017/0111423 | A1 * | 4/2017 | Cui | H04N 21/44227 |
| 2021/0105656 | A1 * | 4/2021 | Estevez | H04L 41/5067 |
| 2021/0306881 | A1 * | 9/2021 | Ye | G06N 3/08 |
| 2022/0007209 | A1 * | 1/2022 | Rushton | H04W 88/08 |

OTHER PUBLICATIONS

Finamore, et al., "YouTube Everywhere: Impact of Device and Infrastructure Synergies on User Experience", IMC'11, pp. 345-360 (2011).
"Real-Time Monitor (RTM) System Guide", Video Clarity, pp. 1-40 (2019).

* cited by examiner

*Primary Examiner* — Michael A Keller

(57) ABSTRACT

Methods, systems, and computer readable media for testing video streaming on a wireless network. An example method includes receiving selection of a video streaming resource for streaming on the wireless network. The method includes recording, at a mobile device, one or more test samples of the video streaming resource streamed over the wireless network. The method includes recording, at a test system, one or more reference samples of the video streaming resource streamed over a wired network distinct from the wireless network. The method includes calculating one or more quality of experience (QoE) performance indicators for video streaming of the video streaming resource on the wireless network by comparing the test samples and the reference samples of the video streaming resource.

20 Claims, 5 Drawing Sheets

SYSTEMS AND METHODS FOR TESTING VIDEO STREAMING ON WIRELESS NETWORKS

TECHNICAL FIELD

The subject matter described herein relates to methods, systems, and computer readable media for testing video streaming on wireless networks.

BACKGROUND

Wireless networks have become integral to our modern connected world, providing convenient and flexible connectivity for various devices. However, ensuring optimal performance, coverage, and reliability of wireless networks can be a complex task. Network administrators and service providers need efficient and accurate methods to test and evaluate the performance of wireless networks in different environments. Traditional testing approaches often involve static measurements or simulations, which may not capture real-world dynamics and variations. As a result, there is a growing need for practical and comprehensive systems that can assess wireless network performance in a more realistic manner.

Accordingly, a need exists for methods, systems, and computer readable media for testing video streaming on wireless networks.

SUMMARY

Methods, systems, and computer readable media for testing video streaming on a wireless network. An example method includes receiving selection of a video streaming resource for streaming on the wireless network. The method includes recording, at a mobile device, one or more test samples of the video streaming resource streamed over the wireless network. The method includes recording, at a test system, one or more reference samples of the video streaming resource streamed over a wired network distinct from the wireless network. For example, the same video streaming resource can be used to get test samples in ideal network conditions, e.g., using a stationary located wired (fiber or cable) connected measurement system. The method includes calculating one or more quality of experience (QoE) performance indicators for video streaming of the video streaming resource on the wireless network by comparing the test samples and the reference samples of the video streaming resource.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for testing video streaming on wireless networks.

This document describes a system for testing wireless networks, leveraging a combination of a backend test system, a wireless network infrastructure, and a mobile device that moves within the testing environment. The system utilizes video streaming as a test mechanism, allowing for dynamic and location-specific assessment of network performance. By capturing real-time data and analyzing it, this system aims to provide valuable insights into the quality, coverage, and stability of wireless networks in diverse scenarios, facilitating network optimization and enhanced user experiences.

Figure 1:
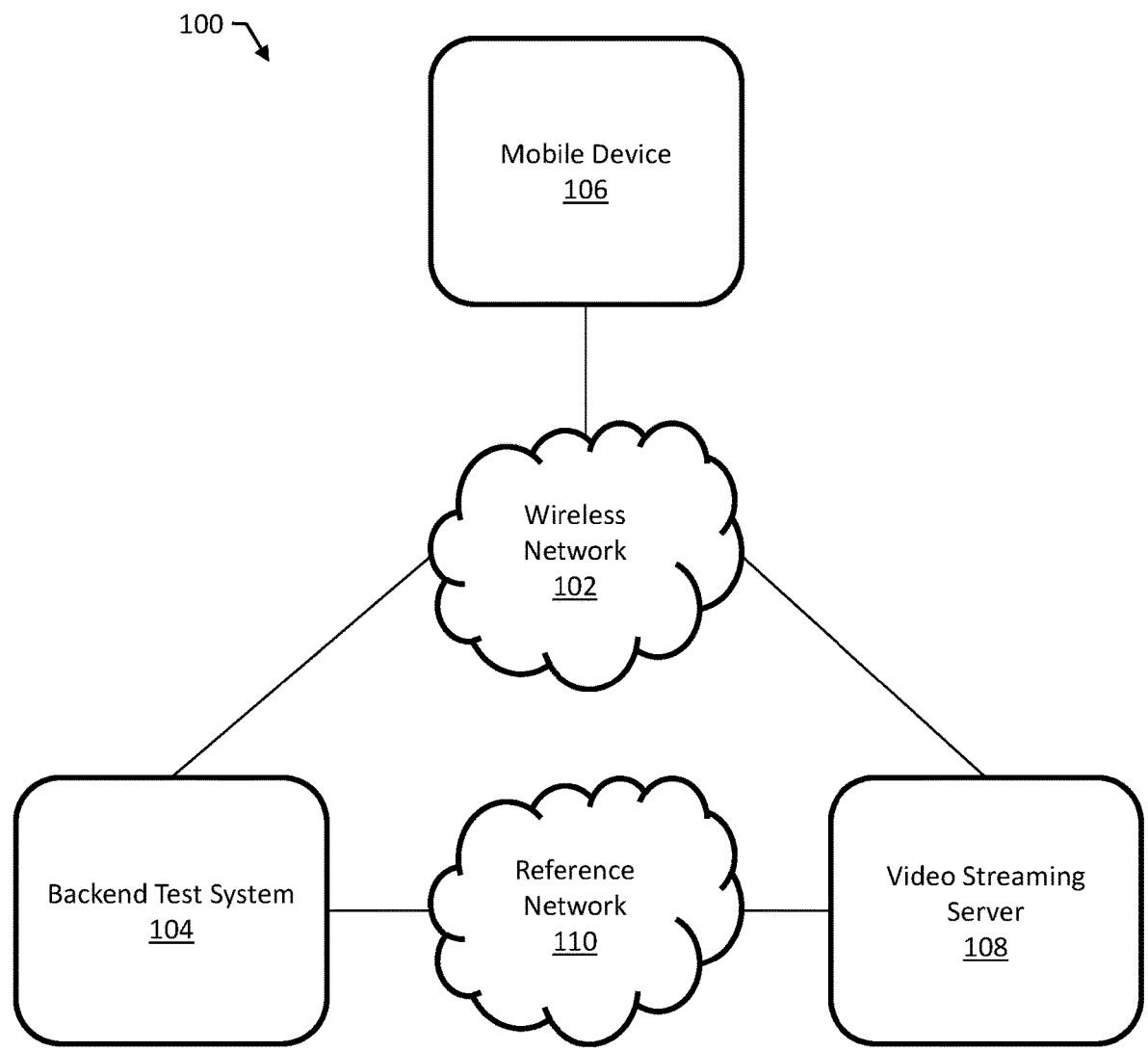
FIG. 1 is a block diagram of an example system for testing video streaming on a wireless network.

FIG. 1 is a block diagram of an example system 100 for testing video streaming on a wireless network 102. The system 100 includes a backend test system 104 and a mobile device 106.

The mobile device 106 is configured for recording one or more test samples of a video streaming resource streamed from a video streaming server 108 over the wireless network 102. The backend test system 104 is configured for recording references samples of the video streaming resource streamed from the video streaming server 108 over a reference network 110. The reference network 110 can be, for example, an ultra-fast fiber network without any network impairments.

The backend test system 104 is configured for calculating one or more quality of experience (QoE) performance indicators for video streaming of the video streaming resource on the wireless network 102 by comparing the test samples and the reference samples of the video streaming resource. The system 100 is configured for repeating the recording of the test samples for a variety of different locations as the mobile device 106 is moved between the locations, and the backend test system 104 can calculate the QoE performance indicators for each location. A network operator can use the QoE performance indicators to locate and troubleshoot issues with the wireless network 102.

Figure 2:
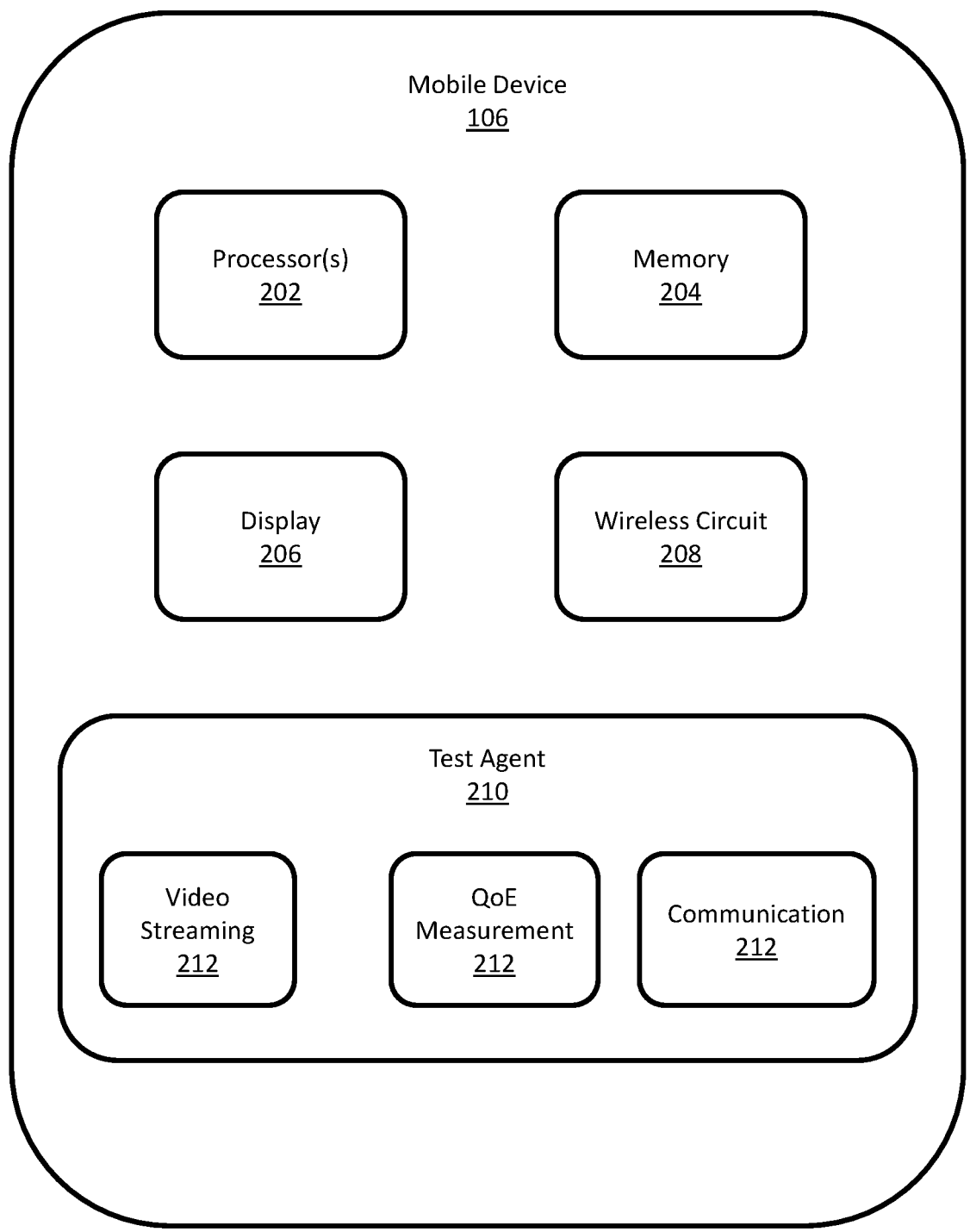
FIG. 2 is a block diagram of an example mobile device.

FIG. 2 is a block diagram of an example mobile device 106. The mobile device includes one or more processors 202 and memory storing instructions for the processors 202. The mobile device 106 includes a display 206 and a wireless communications circuit 208. The mobile device 106 includes a test agent 210 configured for configured for recording one or more test samples of a video streaming resource streamed over a wireless network and sending the test samples to a backend test system for determining QoE performance indicators.

The test agent 210 can include, for example, a video streaming module 212, a QoE measurement module 214, and a communication module 216. The video streaming module 212 is configured for streaming the video streaming resource from a remote server to the mobile device 106. The QoE measurement module 214 is configured for measuring QoE performance indicators of the video streaming resource, such as video quality, video frame rate, and video latency. The communication module 216 is configured for sending the test samples to the backend test system.

The mobile device 106 may be any type of mobile device, such as a smartphone, tablet, or laptop computer. The video streaming resource may be any type of video streaming content, such as a movie, TV show, or live video stream.

The test agent 210 may be implemented in software or hardware. The software implementation of the test agent 210 may be executed on the processors 202. The hardware implementation of the test agent 210 may be implemented on a dedicated test agent chip.

The test agent 210 may be used to measure the QoE performance of video streaming resources under a variety of conditions, such as different wireless network conditions, different video streaming quality levels, and different video streaming formats. The test agent 210 may be used to identify problems with the video streaming resource, such as video quality issues, video frame rate issues, and video latency issues. The test agent 210 may be used to improve the QoE of video streaming resources.

Figure 3:
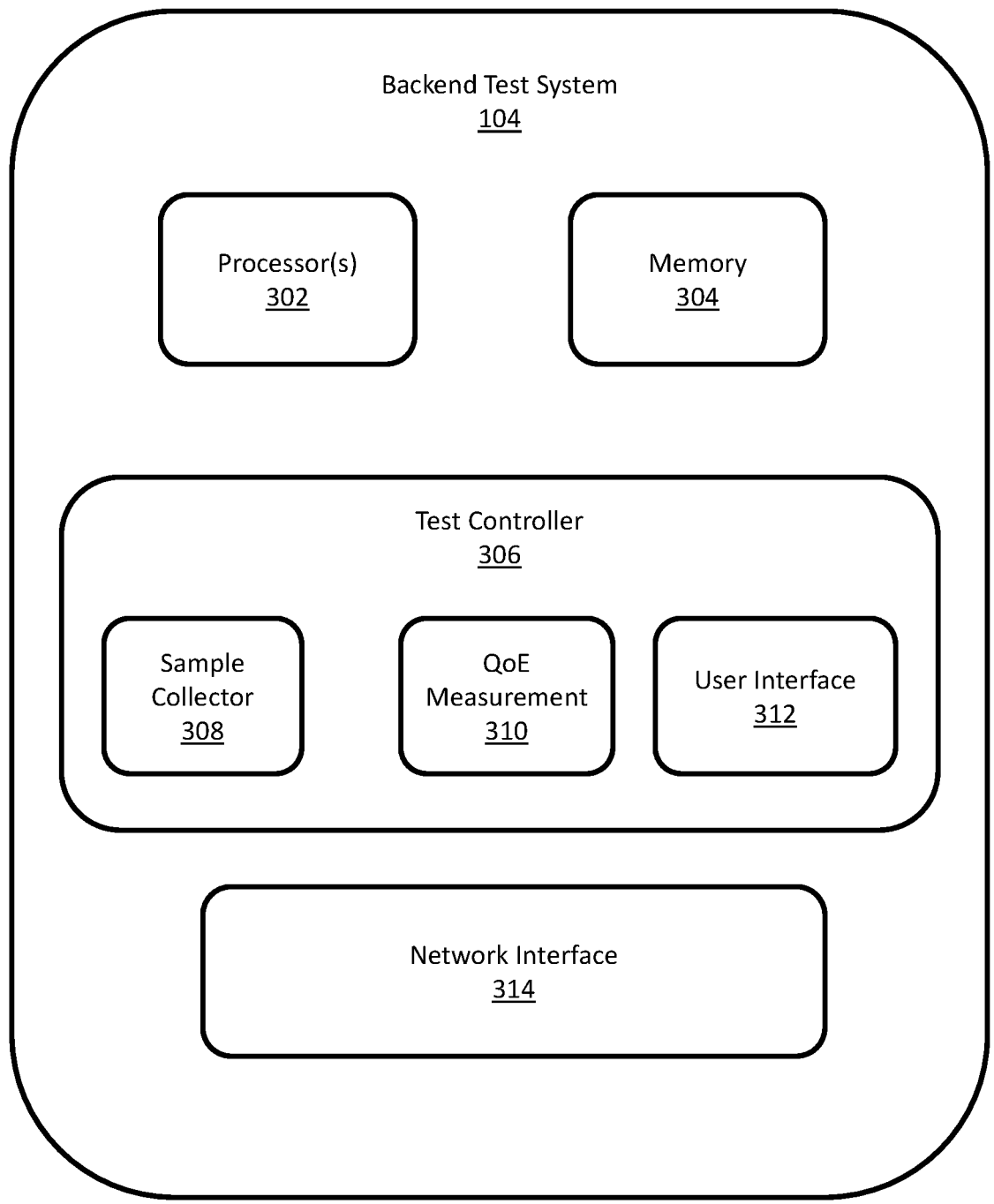
FIG. 3 is a block diagram of an example backend test system.

FIG. 3 is a block diagram of an example backend test system 104. The backend test system 104 includes one or more processors 302 and memory 306 storing instructions for the processors 302.

The backend test system 104 includes a test controller 306 configured for receiving selection of a video streaming resource for streaming on a wireless network and calculating one or more QoE performance indicators for video streaming of the video streaming resource on the wireless network by comparing test samples from a mobile device and reference samples recorded over a reference network.

The test controller 306 can include, for example, a sample collector for recording reference samples of the video streaming resource streamed over the reference network and test samples from a mobile device. The test controller 306 includes a QoE measurement module 310 for measuring QoE performance indicators of the video streaming resource, such as video quality, video frame rate, and video latency. The test controller 306 includes a user interface 312 for displaying the QoE performance indicators to a user.

The backend test system 104 may be any type of system that is used to determine QoE performance indicators of video streaming resources. The backend test system 104 may be implemented in software or hardware. The software implementation of the backend test system 104 may be executed on the processors 302. The hardware implementation of the backend test system 104 may be implemented on a dedicated test system chip.

The backend test system 104 may be used to measure the QoE performance of video streaming resources under a variety of conditions, such as different wireless network conditions, different video streaming quality levels, and different video streaming formats. The backend test system 104 may be used to identify problems with the video streaming resource, such as video quality issues, video frame rate issues, and video latency issues. The backend test system 104 may be used to improve the QoE of video streaming resources.

The user interface 312 can be, for example, a graphical user interface (GUI) that is used to display the QoE performance indicators to a user. The user interface 312 may include a variety of graphical elements, such as charts, graphs, and tables. The user interface 312 may also include a variety of controls, such as buttons, sliders, and text boxes. The user interface 312 may be used to:

Select a video streaming resource for streaming on a wireless network;

View the QoE performance indicators for video streaming of the video streaming resource on the wireless network;

Compare the QoE performance indicators for video streaming of the video streaming resource on the wireless network to the QoE performance indicators for video streaming of the video streaming resource on a reference network;

Save the QoE performance indicators for video streaming of the video streaming resource on the wireless network to a file.

The user interface 312 may be implemented in a variety of ways, e.g., as a web-based application, a desktop application, or a mobile application. The user interface 312 may be accessed by a variety of users, such as video streaming service providers, video streaming content providers, and end users.

Charts may be used to visualize the QoE performance indicators over time. For example, a chart may be used to visualize the video quality of a video streaming resource overtime. Graphs may be used to visualize the relationship between two or more QoE performance indicators. For example, a graph may be used to visualize the relationship between the video quality and the video frame rate of a video streaming resource. Tables may be used to display the QoE performance indicators in a tabular format. For example, a table may be used to display the video quality, video frame rate, and video latency of a video streaming resource.

Buttons may be used to perform actions, such as selecting a video streaming resource for streaming on a wireless network or saving the QoE performance indicators for video streaming of the video streaming resource on the wireless network to a file. Sliders may be used to adjust the values of the QoE performance indicators. For example, a slider may be used to adjust the video quality of a video streaming resource.

Text boxes may be used to enter text, such as the name of a video streaming resource or the URL of a video streaming resource. The user interface 312 may be customized to meet the specific needs of the users. For example, the user interface 312 may be customized to display the QoE performance indicators in a different format or to include different graphical elements and controls.

The backend test system 104 includes a network interface 314 for communicating with the mobile device 106 and the reference network 110 of FIG. 1. The network interface 314 can include, for example, a wired network connector and a wireless communications circuit. The sample collector 308 receives, using the network interface 314, test samples of video streaming resources from the mobile device 106. The sample collector 308 also receives, using the network interface 314, reference samples of video streaming resources from the video streaming server 108 via the reference network 110.

Figure 4:
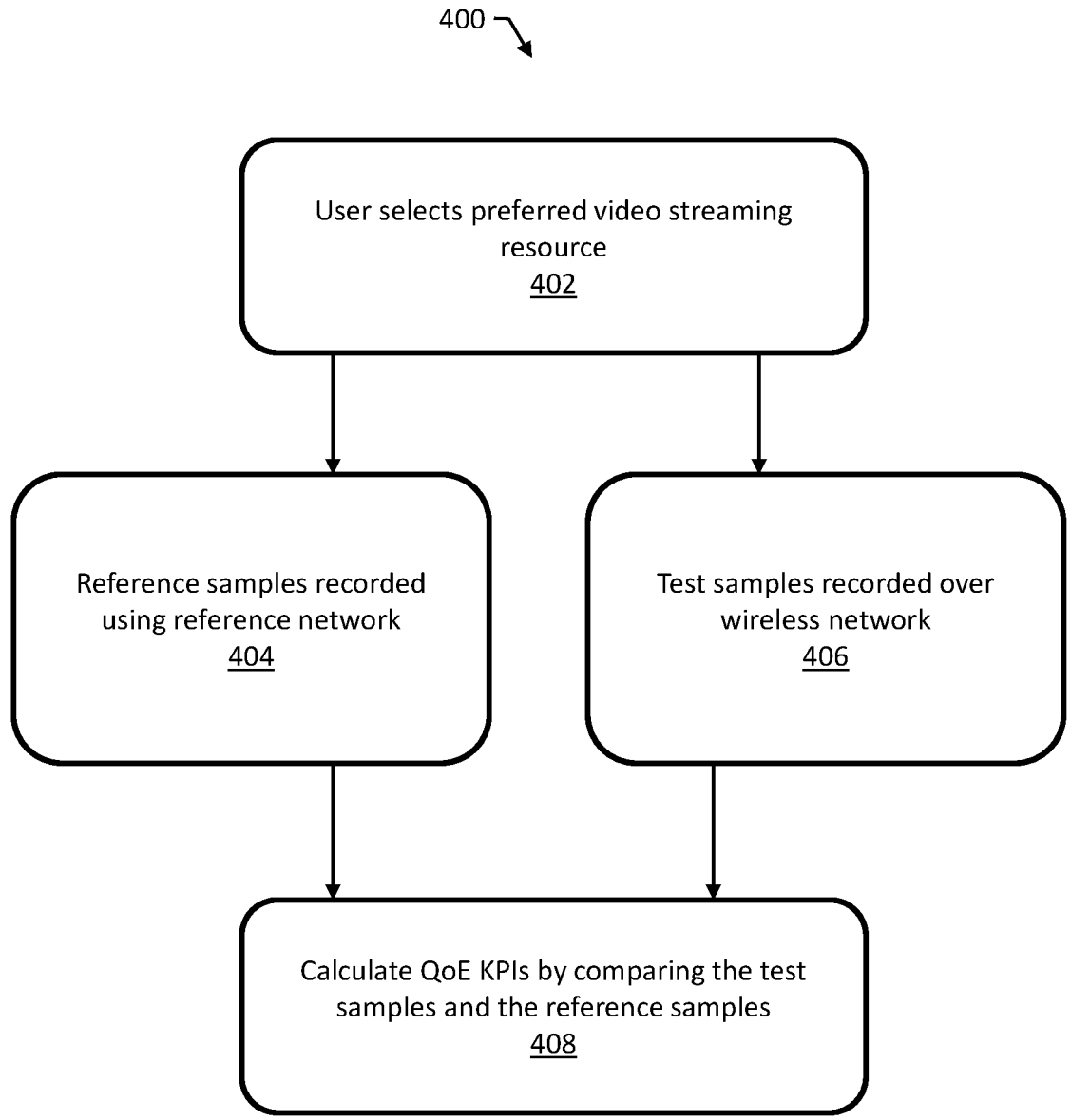
FIG. 4 is a flow diagram of an example method for testing video streaming on a wireless network.

FIG. 4 is a flow diagram of an example method 400 for testing video streaming on a wireless network. The method 400 includes selecting 402, by a user or a test script, a preferred video streaming resource. For example, a user can use a user interface to select a locally relevant (to the test being executed) streaming video link or telemeeting video call, e.g., by specifying a uniform resource locator (URL). In some examples, the user supplies login credentials, e.g., to access a video call.

The method 400 includes recording 404 reference samples of the video streaming resource streamed over a reference network. Recording reference samples can include recording those samples under ideal or near-ideal conditions, for example, over an ultra fast fiber network without any network impairments. The method 400 includes recording 406 test samples, at the mobile device, over the video streaming resource streamed over the wireless network. The test samples and the reference samples can be recorded contemporaneously or at different times.

The method 400 includes using post-processing to calculate 408 QoE KPIs by comparing the test samples and the reference samples. QoE KPIs are metrics that can be used to measure the quality of the video streaming experience. Some examples of QoE KPIs include: video quality, video latency, video buffering, video start-up time, and user satisfaction.

By calculating QoE KPIs, a network operator can get a better understanding of the quality of the video streaming experience on a wireless network. This information can be used to improve the quality of video streaming for users.

In some examples, the method 400 includes generating a streaming video (or real time video call) QoE mean opinion score (MOS). QoE MOS score, or Quality of Experience Mean Opinion Score, is a subjective measure of the perceived quality of a video stream. It is calculated by taking the average of the scores given by a group of users who watch the same video stream under the same conditions. The scores are on a scale of 1 to 5, with 5 being the best possible score.

A high QoE MOS score indicates that the video stream is of high quality and that users are satisfied with the experience. A low QoE MOS score indicates that the video stream is of poor quality and that users are not satisfied with the experience.

QoE MOS scores can be used to measure the quality of a wireless network for video streaming. A high QoE MOS score indicates that the network is capable of delivering high-quality video streams that are satisfactory to users. A low QoE MOS score indicates that the network is not capable of delivering high-quality video streams and that users may experience problems with video streaming.

There are a number of factors that can affect the QoE MOS score of a video stream, including: network bandwidth, network latency, video codec, video resolution, video frame rate, a user's device, and a user's environment. Network operators can use QoE MOS scores to identify and address problems with their networks that are affecting the quality of video streaming. They can also use QoE MOS scores to make decisions about how to invest in their networks to improve the quality of video streaming for their customers.

The testing method 400 can provide one or more of the following advantages:

Usage of ideal conditions without impairments provides the ability to capture sample reference files for any video streaming content or even a video call in real-time or near real-time.

Enable comparison between the ideal conditions recorded reference files with measurements taken over the mobile network connection.

Figure 5:
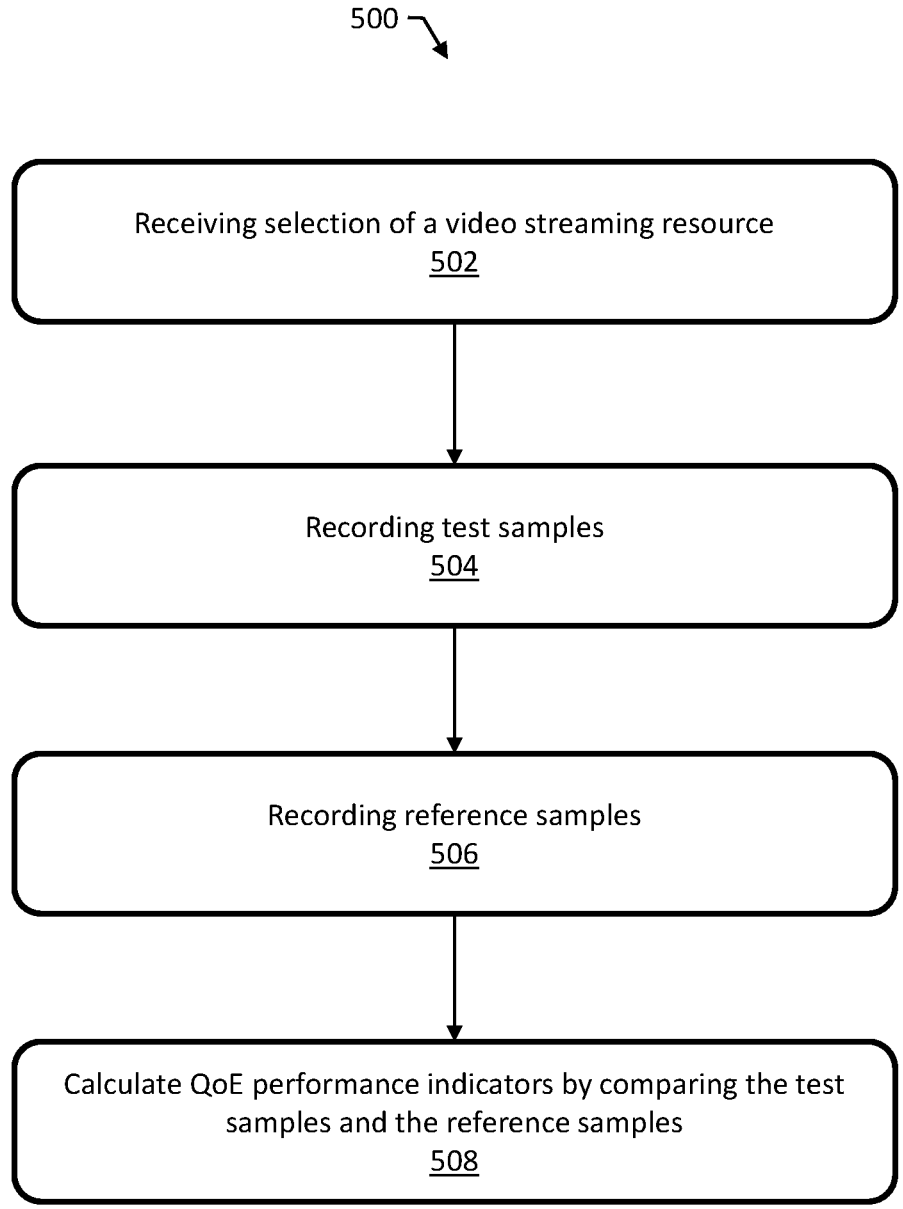
FIG. 5 is a flow diagram of an example method for testing video streaming on wireless networks.

FIG. 5 is a flow diagram of an example method 600 for testing video streaming on wireless networks. The method 500 includes receiving 502 selection of a video streaming resource for streaming on the wireless network. For example, a user can select a locally relevant link to a video streaming service or initiate a video call. A computer system executing a test script can also select the video streaming resource.

The method 600 includes recording 504, at a mobile device, one or more test samples of the video streaming resource streamed over the wireless network. A test sample can include a snippet of the video and optionally accompanying audio. The wireless network can be a wireless cellular network.

The method 500 includes recording 506, at a test system, one or more reference samples of the video streaming resource streamed over a wired network distinct from the wireless network, e.g., a fiber network.

The method 500 includes calculating 508 one or more quality of experience (QoE) performance indicators for video streaming of the video streaming resource on the wireless network by comparing the test samples and the reference samples of the video streaming resource.

The method 500 can include repeating the recording of the test samples for each location of a plurality of locations as the mobile device is moved between the plurality of locations and calculating the QoE performance indicators for each location. The method 500 can include calculating, based on the QoE performance indicators, a QoE mean opinion score (MOS) for the wireless network or a video streaming service provider streaming the video streaming resource or both.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing video streaming on a wireless network, the method comprising:
   receiving selection of a video streaming resource for streaming on the wireless network;
   recording, at a mobile device, one or more test samples of the video streaming resource streamed over the wireless network, wherein recording the one or more test samples includes recording one or more samples of streaming video content streamed over the wireless network;
   recording, at a test system separate from the mobile device, one or more reference samples of the video streaming resource streamed over a wired network distinct from the wireless network, wherein recording the one or more reference samples includes recording one or more samples of the streaming video content streamed over the wired network; and
   calculating one or more wireless network quality of experience (QoE) performance indicators for video streaming of the video streaming resource on the wireless network by comparing the test samples and the reference samples of the video streaming resource.

2. The method of claim 1, comprising repeating the recording of the test samples for each location of a plurality of locations as the mobile device is moved between the plurality of locations and calculating the wireless network QoE performance indicators for each location.

3. The method of claim 1, wherein the video streaming resource is a streaming video or a video meeting.

4. The method of claim 1, wherein recording the reference samples comprises recording the reference samples of the video streaming resource streamed over fiber network lacking one or more network impairments present on the wireless network.

5. The method of claim 1, wherein the wireless network is a wireless cellular network and recording the test samples comprises recording the test samples of the video streaming resource streamed over the wireless cellular network.

6. The method of claim 1, comprising calculating, based on the wireless network QoE performance indicators, a QoE mean opinion score (MOS) for the wireless network or a video streaming service provider streaming the video streaming resource or both.

7. The method of claim 1, wherein receiving selection of a video streaming resource comprises receiving, from a user, a uniform resource locator (URL) specifying the video streaming resource.

8. A system for testing video streaming on a wireless network, the system comprising:
a test system configured for receiving selection of a video streaming resource for streaming on the wireless network and recording one or more reference samples of the video streaming resource streamed over a wired network distinct from the wireless network, wherein recording the one or more reference samples includes recording one or more samples of streaming video content streamed over the wired network; and
a mobile device separate from the test system and configured for recording one or more test samples of the video streaming resource streamed over the wireless network, wherein recording the one or more test samples includes recording one or more samples of the streaming video content streamed over the wireless network;
wherein the test system is configured for calculating one or more wireless network quality of experience (QoE) performance indicators for video streaming of the video streaming resource on the wireless network by comparing the test samples and the reference samples of the video streaming resource.

9. The system of claim 8, wherein the system is configured for repeating the recording of the test samples for each location of a plurality of locations as the mobile device is moved between the plurality of locations and calculating the wireless network QoE performance indicators for each location.

10. The system of claim 8, wherein the video streaming resource is a streaming video or a video meeting.

11. The system of claim 8, wherein recording the reference samples comprises recording the reference samples of the video streaming resource streamed over fiber network lacking one or more network impairments present on the wireless network.

12. The system of claim 8, wherein the wireless network is a wireless cellular network and recording the test samples comprises recording the test samples of the video streaming resource streamed over the wireless cellular network.

13. The system of claim 8, wherein the test system is configured for calculating, based on the wireless network QoE performance indicators, a QoE mean opinion score (MOS) for the wireless network or a video streaming service provider streaming the video streaming resource or both.

14. The system of claim 8, wherein receiving selection of a video streaming resource comprises receiving, from a user, a uniform resource locator (URL) specifying the video streaming resource.

15. A non-transitory computer readable medium having stored thereon executable instructions embodied in the non-transitory computer readable medium that when executed by at least one processor of a computer cause the computer to perform steps comprising:
receiving selection of a video streaming resource for streaming on the wireless network;
recording, at a mobile device, one or more test samples of the video streaming resource streamed over the wireless network, wherein recording the one or more test samples includes recording one or more samples of streaming video content streamed over the wireless network;
recording, at a test system separate from the mobile device, one or more reference samples of the video streaming resource streamed over a wired network distinct from the wireless network, wherein recording the one or more reference samples includes recording one or more samples of the streaming video content streamed over the wired network; and
calculating one or more wireless network quality of experience (QoE) performance indicators for video streaming of the video streaming resource on the wireless network by comparing the test samples and the reference samples of the video streaming resource.

16. The non-transitory computer readable medium of claim 15, comprising repeating the recording of the test samples for each location of a plurality of locations as the mobile device is moved between the plurality of locations and calculating the wireless network QoE performance indicators for each location.

17. The non-transitory computer readable medium of claim 15, wherein the video streaming resource is a streaming video or a video meeting.

18. The non-transitory computer readable medium of claim 15, wherein recording the reference samples comprises recording the reference samples of the video streaming resource streamed over fiber network lacking one or more network impairments present on the wireless network.

19. The non-transitory computer readable medium of claim 15, wherein the wireless network is a wireless cellular network and recording the test samples comprises recording the test samples of the video streaming resource streamed over the wireless cellular network.

20. The non-transitory computer readable medium of claim 15, comprising calculating, based on the wireless network QoE performance indicators, a QoE mean opinion score (MOS) for the wireless network or a video streaming service provider streaming the video streaming resource or both.

* * * * *